3,310,457
GLASS-REINFORCED EPOXIDE RESIN LAMINATE AND METHOD OF MAKING SAME

John W. Trebilcock, Wilmington, Del., assignor to E. I. du Pont de Nemours and Company, Wilmington, Del., a corporation of Delaware
No Drawing. Filed Nov. 29, 1962, Ser. No. 241,028
3 Claims. (Cl. 161—185)

This application is a continuation-in-part of my copending application Ser. No. 22,404, filed Apr. 15, 1960, now abandoned.

This invention relates to methods for preparing high strength glass-reinforced epoxide resin laminates using glass elements that have been treated with a Werner chromium complex of gallic or tannic acid having a chromium to acid ratio of about 1:1 or under.

In preparing laminated articles made from a wide variety of resins, it has been customary practice to utilize reinforcing elements, such as glass cloth or fibers, in the articles to provide increased strength. It is also known that such reinforcing elements may be treated with any of a large number of materials to improve the adhesion of the resin to the reinforcing elements.

While some Werner chromium complexes have been satisfactory as treating agents for the reinforcing elements in that the complexes provided satisfactory resin-to-element adhesion as long as the laminated product was used under substantially dry conditions, it has been known that such chromium complexes left much to be desired when the laminated product was used under conditions of high humidity or moisture, and especially when used in contact with or under water as in pipes, tubing, boats and boating equipment. As a result, based on this experience, the art has sought for this use glass treating agents of types radically different from chromium complexes.

The problem described above is particularly critical in the preparation and use of laminated products made from expoxide resins.

According to the present invention, a glass-reinforced epoxide resin laminate of high wet strength, as high as 50% to 100% and greater than that of prior art products using chrome complex tereated glass, is now discovered to be possible, by the combined use of (1) an epoxide resin and (2) a Werner chromium complex selected from the critical and small group consisting of the chromium complex of gallic acid and the chromium complex of tannic acid, each having a chromium to acid ratio of about 1:1 or under.

The process of this invention comprises treating a reinforcing element, often referred to as a substrate and usually consisting of glass fibers or cloth, with a solution of the chromium complex of gallic acid or tannic acid in water, drying the treated reinforcing element, and incorporating the treated element in epoxide resin to form the desired laminate having outstandingly high strengths, both dry and wet strengths, the latter being evidenced even after boiling in water for long periods of time.

Preferably, the chromium complexes are applied to the reinforcing elements from dilute solutions in water For example, a 2% aqueous solution of a complex commodity containing 3% chromium is prepared, neutralized to a pH of about 5.5, and the substrate, such as glass cloth, is immersed in the aqueous solution. The wet cloth is then dried at an elevated temperature to set the complex. The cloth can be washed to remove salts and redried, or used as is to form laminates.

The laminating procedure can follow any of the methods well known in the laminating industry and the particular manipulative steps used are not critical. Suitable procedures are disclosed, for example, in Biefeld U.S. Patent No. 2,763,573 issued Sept. 18, 1956.

The gallic and tannic acid chromium complexes used in the present invention can be made by reaction in solution between gallic acid or alternatively tannic acid, and a basic chromium salt of a monobasic acid, preferably basic chromic chloride. It is generally preferred to carry out the reaction by refluxing the ingredients in a solvent such as isopropanol for a period of about five to thirty minutes. It has been surprisingly and unexpectedly found that in order to obtain laminates having an outstandingly high wet strength, to use a chromium to carboxylic acid mole ratio of about 1:1 or less. A ratio of about 0.6:1 to 1:1 gives outstanding results and is therefore preferred.

A basicity of less than 50% is preferred, with 33½% being the most preferred. The concentration of the complex in the complex commodity will be governed by economics and well-known use procedures. A complex commodity having 3% chromium is preferred. The important factor in the present invention is the chromium to acid mole ratio.

Suitable methods for preparing the complexes are disclosed, for example, in the Goebel and Iler U.S. Patent No. 2,544,667 issued March 13, 1951, and Iler U.S. Patent No. 2,683,156 issued July 6, 1954. Suitable procedures are also described in the examples below.

The reinforcing element can be any of those generally used in the art. Although the description of the invention is set forth primarily with reference to glass cloth and glass fiber reinforcing, it will be understood that equivalent material can be used, including inorganic fillers such as clay, silica, mica, alumina and asbestos, or organic material such as cellulose, paper, or natural or synthetic fibers or fabric.

The term "epoxide resin" is used herein in its conventional and widely understood meaning. There are many well-known epoxide resins suitable for the making of laminated structures and other resin articles.

Typical of suitable epoxide resins can be mentioned those containing the following structural element:

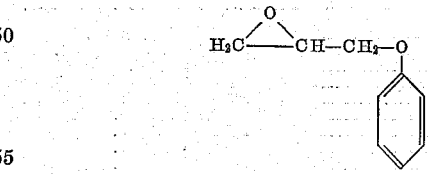

Epoxide resins having this structural feature are obtained by the epoxidation of fusible, hydroxy group containing phenol fomaldehyde resins with haloepoxy alkanes, such as epichlorohydrin. Preparation of suitable epoxide resins is described in such references as D'Alelio U.S. Patent No. 2,683,130 issued July 6, 1954; D'Alelio U.S. Patent No. 2,695,894 issued November 30, 1954; and Napravnik et al. U.S. Patent No. 2,829,124 issued Apr. 1, 1958. These resins are commercially available from the Borden Company under the trade name "Epiphen."

Other suitable epoxide resins are also obtained from reaction of epichlorohydrin and polyhydric phenols and alcohols. The preparation of such epoxide resins has been disclosed in the literature, for example, Castan U.S. Patent No. 2,324,483 issued July 20, 1943; Greenlee U.S. Patent No. 2,494,295 issued Jan. 20, 1950; Bradley U.S. Patent No. 2,500,600, issued Mar. 14, 1950; Greenlee U.S. Patent No. 2,511,913 issued June 20, 1950; Castan U.S. Patent No. 2,444,333, issued June 29, 1948; DeTrey British patent specification No. 518,057 issued Feb. 15, 1940; and DeTrey British patent specification No. 579,698 issued Aug. 13, 1946. The resins disclosed in these patents have the general formula:

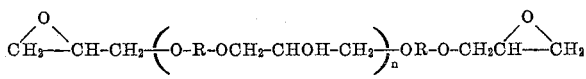

where $n$ may vary from 0 to 20, and R represents the divalent hydrocarbon radical of the dihydric phenol or polyalcohol.

Any of the various dihydric phenols can be employed to form the epoxide resins including mononuclear phenols, such as resorcinol, hydroquinone, methyl resorcinol, catechol of polynuclear phenols such as 2,2′-bis(4-hydroxyphenyl)propane known as "bis-phenol A," 4,4′-dihydroxybenzophenone, bis(4-hydroxyphenyl)ethane, 1,1′-bis(4-hydroxyphenyl)butane, 2,2′-bis(4-hydroxy-2-methylphenyl)propane, 2,2′-bis(4-hydroxy-2-tertiary-butylphenyl)propane, 2,2′-bis(2-hydroxynaphthyl)pentane, 1,5-dihydroxynaphthalene, and the like. The polyalcohols include ethylene glycol, 2,3-butanediol, glycerol and erythritol.

It will be understood that the epoxide resins are generally mixtures of compounds each having the indicated structure and that the number herein designated as "$n$" is the average of the integral numbers which characterize each compound making up these mixtures.

The epoxide resins useful in the laminates described herein are furthermore characterized by their epoxide equivalent weight. By the term "epoxide equivalent weight" reference is made to the weight of epoxide resin which contains and is equivalent to one epoxide group. For the purposes for use in laminates, epoxide resins typically have epoxide equivalents between 140 and 600. Molecular weights of 300 to 1100 are very suitable.

Many suitable epoxide resins are commercially available and among suitable ones can be mentioned those having the trade name "Epon" from Shell Chemical Corp., under the trade name "Araldite" from the Ciba Company, under the trade name "ERL" resins from the Bakelite Company, Division of Union Carbide Corporation, and under the trade name of "Epi-Rez" from the Devoe and Raynolds Company. Data as follows is representative for such resins.

TABLE I

| Epoxide Resin | Epoxide Equivalent | Melting Point, °C. |
|---|---|---|
| Epon 828 | 192 | 9 (Liquid). |
| Epon 834 | 225–290 | 20–28 (Liquid). |
| Epon 1064 | 300–375 | 40–45. |
| Epon 1001 | 450–525 | 64–76. |
| Epon 1004 | 905–985 | 97–103. |
| Araldite 1064 | 192 | Liquid. |
| Araldite 6020 | 200–205 | Do. |
| ERL 2774 | 175–200 | Do. |
| Epi-Rez 510 | 175–200 | Do. |
| Epiphen 845 | 200–220 | Do. |
| Epiphen 847 | 180–200 | Do. |
| Epiphen 849 | 180–200 | Do. |
| Epiphen 851 | 180–200 | Do. |
| Epiphen 822 | 200–220 | Do. |

Epoxide resins can be transformed readily from the liquid or thermoplastic state to tough, hard thermoset solids by means of a chemically reactive curing agent. Typical curing agents, well known in the art, include primary aliphatic amines such as diethylene triamine, cyclic aliphatic amines such as piperidine, aromatic amines such as meta-phenylene diamine, and organic acids and acid anhydrides such as oxalic acid and phthalic anhydride. Mixtures of curing agents are sometimes used.

The outstanding advantage of the present invention lies in the significantly lower loss of strength due to wet conditions in the reinforced epoxy resin laminate. Another significant advantage is that the treatment described above also improves the wetting of the glass reinforcing element with the resin during lamination.

The outstanding advantage of extremely high wet strength obtained for epoxy resin laminates by the practice of the present invention is considered to be completely unobvious, in view of the failure of commercially available chromium complexes to give completely satisfactory results.

In place of the tannic and gallic acid chromium complexes, chromium complexes of other trihydroxy benzoic acids, such as pyrogallol carboxylic acid, and other glucosides which give gallic acid on hydrolysis can be used. Similarly, phenolic or melamine resins can be used instead of the epoxide resin.

The invention will be better understood by reference to the following illustrative examples:

*Example 1*

A chrome complex of tannic acid containing 5% chromium, and having a chromium to carboxylic acid mole ratio of 1 to 1 is prepared as follows: To 613 grams of a basic chromic chloride containing 8.16% chromium, 11.24% chlorine, and 23.9% water is added 310 grams of tannic acid and 77 grams of water, to give a total weight of 1000 grams. This mixture is poured into a flask fitted with a heating mantle and reflux condenser, is heated at reflux at 79° C. for 15 minutes, and is cooled to room temperature. The final complex solution is green in color and contains 4.98% chromium.

*Example 2*

A chrome complex of gallic acid containing 3% chromium, and having a chromium to carboxylic acid mole ratio of 1 to 1 is prepared as follows: To 591 grams of basic chromic chloride having a chromium content of 7.61%, a chloride content of 10.48%, and a water content of 3.36% is added 147 grams of gallic acid and 762 grams of isopropanol. This mixture is poured into a flask fitted with a heating mantle and reflux condenser, heated to reflux at 80° C. and held for 15 minutes and cooled. The final complex solution has a greenish color.

*Example 3*

The chrome complex of tannic acid prepared in Example 1 is used to treat glass cloth for reinforcement of epoxy resin laminates in the following manner: A treating solution is prepared by adding 48 grams of the chrome complex of tannic acid to 1952 grams of water, with agitation. The pH of this solution is then adjusted to a value of 4.4 with 121 mls. of a 1% solution of NH₃, in water.

Heat cleaned glass fabric, 181 weave, is then immersed in this solution for a period of 2 minutes. Excess solution is removed from the glass fabric by passing it through a rubber rolled hand wringer to give a wet pickup of 41.9%. The fabric is dried for a period of 10 minutes in an air circulation oven at 150° C., removed and allowed to cool to room temperature. The glass fabric is then washed by immersing in fresh water for two minutes, wringing and redrying. A laminate containing the glass cloth is prepared by impregnating the treated glass fabric with a liquid epoxy resin having an average molecular weight of 350 to 400 and containing 14 parts of meta-phenylene diamine per 100 parts of resin, as a curing agent. A sandwich containing 12 layers of treated glass fabric is formed and cured under a pressure of 25 p.s.i. and a temperature of 112° C. for one hour. The laminate is cut into one-half inch wide pieces in the warp direction of the glass cloth, and is tested for dry and wet flexural strength, following the method outlined in Federal specification L–P–406a, except that 100 hours' boiling in water is used for the conditions for the wet test. A dry flexural strength of 86,200 p.s.i. and a wet flexural strength after boiling for 100 hours in water of 64,300 p.s.i. is obtained. A laminate prepared from untreated glass cloth in a similar manner has a dry strength of only 70,100 p.s.i. and a wet flexural strength of only 28,900 p.s.i., after boiling for 100 hours in water.

*Example 4*

An epoxide resin laminate reinforced with glass cloth treated with the chrome complex of gallic acid prepared in Example 2 is prepared as follows:

A treating solution for applying the chrome complex to glass fabric is prepared by adding 40 grams of the complex prepared in Example 2 to 1960 grams of water with agitation. The pH of the solution is adjusted to a value of 5.45 with 58.2 mls. of an aqueous solution containing 1% $NH_3$.

A sample of heat cleaned glass fabric, 181 weave, is treated in the complex solution as outlined in Example 3, giving a wet pickup of 38.4%. The cloth is dried, washed, redried, and a laminate is prepared using liquid epoxide resin as outlined in Example 3. The dry flexural strength of the laminate is 79,700 p.s.i., the wet flexural strength after boiling in water for 100 hours is 65,100 p.s.i., and the wet flexural strength after boiling in water for 500 hours is 56,400 p.s.i. A laminate prepared from untreated glass cloth has strengths only of 70,100 p.s.i., 28,900 p.s.i., and 24,800 p.s.i., respectively.

*Example 5*

The chrome complex of gallic acid prepared in Example 2 is used in a reinforcement size of glass fibers as shown in the following example:

A typical size solution is prepared by adding 476 parts of a plasticized polyvinyl acetate based emulsion to 3000 parts of cold water containing an antifoam agent. A dispersion containing 22.4 parts of a size lubricant and 200 parts of cold water is prepared and added to the polyvinyl acetate solution. A solution containing 270 parts of the chrome complex of gallic acid in 3865 parts of water is prepared and is added to the above mixture with agitation. The pH of the size solution is adjusted to a value of 4.5 with a dilute ammonium hydroxide solution and enough water is added to bring the final weight to 9000 parts. After the size solution has been agitated so that it is uniform throughout, the size is ready to be used to treat glass fibers.

The sizing of freshly prepared boro-silicate glass fibers is well known in the glass industry. As the molten glass flows out of the bottom of an electrically heated platinum bushing, it solidifies into fibers. The size solution is then applied while the glass is in its most reactive form, and the fibers are gathered together into a bundle called a strand, which is then wound onto a spool at high speeds. When the spool is full, it is removed and dried at elevated temperatures to harden the size. A reinforcing size of the type described in this example enables the fiber to pass through mechanical processes without loss of strength due to bending or abrasion, allows the glass to be easily wet out by plastic resins, and produces a good bond between the glass and the resin.

After the sized glass is dried a test laminate is prepared as follows:

Lengths of the glass strand are cut and folded into a bundle which is soaked with a liquid epoxide resin containing a curing agent as described in Example 3. The bundle of glass fibers containing the catalyzed resin is placed in a mold and pressure and heat are applied in a high pressure press until the resin has cured. In this manner, laminates containing a high percentage of glass are obtained. The laminate is cooled, removed from the die and cut into ½" wide pieces parallel to the direction of the glass fibers and tested for flexual strength, both dry and after 100 hours' boiling in water. The laminate prepared from the glass sized with a size containing the chrome complex of gallic acid possesses a high wet flexural strength, compared to a laminate prepared from glass sized with a size that did not contain a coupling agent.

*Example 6*

Various fillers are added to resins to either change the properties of the finished article, or to reduce the cost. The addition of fillers, however, often makes the article sensitive to water, due to absorption of water along the filler-resin interface. This example shows how a filler for epoxide resins can be treated with the chrome complex of gallic acid to decrease the water sensitivity of a filled epoxide resin potting mixture used to protect electrical components.

To 700 parts of water is added 2 parts of the complex of gallic acid prepared in Example 2, above, giving a solution having a pH of 3.15. To this solution is added 200 parts of finely powdered silica with agitation. The pH at the end of this step is 4.2. A solution of 1% ammonia in water is added to the dispersion of silica in the complex solution until a pH of 5.5 is obtained. The dispersion is stirred for 15 minutes and then filtered to remove the silica. The filtrate is clear, indicating that the chrome complex has been adsorbed on the surface of the silica. The filter cake is washed with excess water to remove any soluble matter, such as salts, and is then dried at 150° C. in an air circulation oven. The dried silica is screened on a 60 mesh screen to remove lumps.

A filled epoxide potting resin mixture is prepared from the treated silica as follows: Metaphenylenediamine at a level of 14 parts per 100 parts of resin is added to an epoxide resin having an epoxide equivalent of 175 and an average molecular weight of 350. One hundred parts of the treated filler is added to 100 parts of the epoxide resin mixture and the composition is compression molded into flat discs. A pressure of 5 tons is used in the mold, and the cure schedule is 30 minutes at 300° F.

The discs are exposed to times up to 3 months at 130° F. and a relative humidity of 100%, and the electrical resistance is measured daily.

The electrical resistance of the discs filled with the filler treated with the chrome complex of gallic acid is over $10^{12}$ ohms, which is the maximum reading of the scale of the testing instrument. A disc filled with untreated silica gives an initial reading of only $10^9$ ohms. Upon extended exposure the discs filled with the treated filler maintain the maximum resistance readings for the full three months of the testing period, while the discs filled with the untreated filler decrease in electrical resistance continuously over the three-month period.

At the end of the three-month period described above, the discs are tested for compressive strength. The disc filled with the treated silica has a compressive strength which is much higher than that of the disc filled with the untreated silica.

What is claimed is:

1. In a process for treating glass reinforcing elements with a bonding agent, and subsequently incorporating the treated elements in an epoxide resin to form a laminate having outstandingly high wet strength, the improvement comprising using as said bonding agent a Werner complex of chromium and an acid selected from the group consisting of gallic and tannic acid, the ratio of chromium atoms to acido groups being 1:1 or less and the complex having a basicity of less than 50%.

2. A glass-reinforced epoxide resin laminate having outstandingly high wet strength comprising: glass-reinforcing elements treated with a Werner complex of chromium and an acid selected from the group consisting of gallic acid and tannic acid, the ratio of the chromium atoms to acido groups being 1:1 or less, the complex having a basicity of less than 50%, and an epoxide resin containing a curing agent, said treated glass-reinforcing elements impregnated with said epoxide resin.

3. The laminate of claim 2 wherein the ratio of chromium atoms to acido groups is within the range of about 0.6:1 to 1:1.

References Cited by the Examiner

UNITED STATES PATENTS

| | | | |
|---|---|---|---|
| 2,544,668 | 3/1951 | Goebel et al. | 161—188 X |
| 2,552,910 | 5/1951 | Steinman | 117—126 X |
| 2,611,718 | 9/1952 | Steinman | 117—72 |
| 2,683,156 | 7/1954 | Iler | 260—438 |
| 2,763,573 | 9/1956 | Biefeld | 117—72 |
| 2,825,659 | 3/1958 | Dalton et al. | 260—438 X |

EARL M. BERGERT, *Primary Examiner.*

HAROLD ANSHER, *Examiner.*